United States Patent [19]

Weigert

[11] 4,136,156
[45] Jan. 23, 1979

[54] PRODUCTION OF HCN FROM ORGANIC NITRILES

[75] Inventor: Frank J. Weigert, Wilmington, Del.

[73] Assignee: E. I. Du Pont de Nemours and Company, Wilmington, Del.

[21] Appl. No.: 718,681

[22] Filed: Aug. 30, 1976

[51] Int. Cl.$^2$ ............................................. C01C 3/02
[52] U.S. Cl. ................................................... 423/372
[58] Field of Search ................ 423/372; 208/354 H, 208/354 R; 252/460, 457, 458, 467; 260/683.9, 465.3

[56] References Cited

U.S. PATENT DOCUMENTS

| | | | |
|---|---|---|---|
| 2,384,737 | 9/1945 | Haas | 252/467 |
| 2,449,643 | 9/1948 | Cosby | 260/465 |
| 2,584,531 | 2/1952 | Arnold et al. | 260/666 |
| 2,671,107 | 3/1954 | Beckberger | 252/467 |
| 2,702,815 | 2/1955 | Walker | 260/465 |
| 2,867,628 | 1/1959 | Cass | 260/346.8 |
| 3,057,906 | 10/1962 | Fierce et al. | 260/465.3 |
| 3,177,258 | 4/1965 | Rylander et al. | 260/611 |
| 3,371,990 | 3/1968 | Krebaum | 423/372 |
| 3,481,867 | 12/1969 | Dellert | 208/254 R |
| 3,524,874 | 8/1970 | Kominami et al. | 252/460 |
| 3,591,656 | 7/1971 | Kroll | 260/683.9 |
| 3,658,471 | 4/1972 | Sperka | 423/376 |
| 3,847,989 | 11/1974 | Platz et al. | 260/570.9 |
| 3,929,619 | 12/1975 | Sinfelt et al. | 252/460 |

OTHER PUBLICATIONS

Masterton et al., Chemical Principles, 2nd Edition, 1969, pp. 362-364.

Primary Examiner—O. R. Vertiz
Assistant Examiner—Thomas W. Roy

[57] ABSTRACT

Hydrogen cyanide is produced by reacting an organic nitrile with hydrogen at temperatures of 400-700° C in the presence of selected catalysts. Exemplary is the reaction of benzonitrile and hydrogen at 600° C in the presence of chromia on alumina to produce hydrogen cyanide.

9 Claims, No Drawings

PRODUCTION OF HCN FROM ORGANIC NITRILES

BACKGROUND OF THE INVENTION

1. Field of the Invention

Hydrogen cyanide is produced when an organic nitrile is reacted with hydrogen at 400°–700° C. in the presence of selected catalysts. The process is a hydrodecyanation reaction as shown by the reaction $$RCN + H_2 \rightarrow RH + HCN$$

where R is a hydrocarbon radical such as phenyl.

2. Prior Art

Krebaum, U.S. Pat. No. 3,371,990 reacts an organic nitrile with hydrogen at 600°–850° C. in the absence of any catalyst and obtains hydrogen cyanide. The efficiency of this process is low.

Walker, U.S. Pat. No. 2,702,815 heats benzonitrile alone at temperatures of 500°–1000° C. to obtain a mixture of phthalonitriles. Hydrogen cyanide, benzene and other materials are obtained as by-products and the efficiency of this process is also low.

Arnold et al., U.S. Pat. No. 2,584,531 hydrogenate an organic compound such as benzonitrile in the presence of a catalyst comprising a metal molybdite. The products obtained are benzylamine and 2,4,5-triphenylimidazole.

Cass, U.S. Pat. No. 2,867,628 hydrogenates an organic compound at ambient temperature in the presence of palladium. Toluene is the product obtained when benzonitrile is used.

Rylander et al., U.S. Pat. No. 3,177,258 hydrogenates an organic compound at 0°–350° C. in the presence of a ruthenium metal catalyst. The products are stated to be mixtures of amines when a nitrile is used.

Sperka, U.S. Pat. No. 3,658,471 prepares HCN from acetonitrile and ammonia using a platinum group metal catalyst at elevated temperatures of 1100°–1400° C.

DESCRIPTION OF THE INVENTION

It has now been found that hydrogen cyanide can be efficiently produced by heating hydrogen with an organic nitrile in the presence of selected catalysts.

The invention can be stated as the process of preparing HCN comprising reacting hydrogen in a nonoxidative atmosphere with an organic nitrile of the formula RCN or NCR$^1$CN wherein
R is alkyl of 1-5 carbons wherein the alpha carbon bears a hydrogen atom and the beta carbon bears no hydrogen atom;
alkenyl of 2-3 carbons substituted with up to one phenyl radical;
phenyl substituted with up to three alkyl radicals of 1-2 carbons each;
benzyl substituted with up to three alkyl radicals of 1-2 carbons each; or pyridyl;
R$^1$ is a single bond; methylene; phenylene substituted with up to two alkyl radicals of 1-2 carbons each;
at a temperature of 400°–700° C., in the presence of a catalytically effective amount of a catalyst selected from the group consisting of
(A) a supported metal of the Group Ir, Rh, Ru, Pd and Pt and
(B) an oxide of a metal of the group Al, Cr, Mg, Mn and Zn, and recovering HCN.

"Alkyl" is a monovalent radical derived by removal of one hydrogen atom from an alkane.

"Alkenyl" is a monovalent radical derived by removal of one hydrogen atom from an alkene.

Organic nitriles which can be used include acetonitrile, 3,3-dimethylbutylnitrile, acrylonitrile, methacrylonitrile, benzonitrile, methylbenzonitrile, ethylbenzonitrile, dimethylbenzonitrile, diethylbenzonitrile, trimethylbenzonitrile, triethylbenzonitrile, 3-phenylpropenenitrile, benzylcyanide, methylbenzylcyanide, ethylbenzylcyanide, dimethylbenzylcyanide, trimethylbenzylcyanide, α,β, and γ-pyridylnitrile, ethanedinitrile(cyanogen), dicyanomethane, dicyanobenzene and the like.

Preferred are benzonitrile and alkylated benzonitriles such as the toluonitriles and the xylylnitriles.

The catalysts include either a supported metal (Ru, Rh, Pd, Pt, or Ir) or an oxide of Al, Mg, Cr, Zn, or Mn. The metal is generally supported on an inert carrier such as silica or carbon or supported on the above specified catalytic oxides. The oxides used are stable under conditions employed in the reaction and can by used individually, as mixtures, or supported on inert supports such as silica. For the purpose of this invention the metal, when employed as the catalyst, is present in an amount of 0.05 to 7.5% based on the combined weight of metal and support. More than 6% does not increase the yield and is uneconomic as to cost. When the metal oxides are used with an inert carrier the oxides are present in an amount of at least 5% and generally 10% or more.

The reaction can be carried out over a wide pressure range. In large scale reactions, superatmospheric pressure is advantageous to increase efficiency of equipment and catalyst contact. Pressures in the range of 0.5 to 20 atmospheres are particularly suitable but pressures of up to 100 atmospheres or higher can be used.

Hydrogen cyanide is produced when hydrogen and the nitrile make physical contact with the catalyst at the reaction temperature. Any amount of catalyst can be used since it merely needs to be present in order for contact and reaction to occur, i.e., a catalytically effective amount is employed. The time during which the reactants are in contact with the catalyst at the reaction temperature is the contact time and can vary over a wide range, depending, e.g., upon the length of the reaction column and rate of introduction of reactants. It can range from 0.05 sec. to 10 minutes or more although it is preferred that it be 0.1 sec. to 8 minutes. With elevated pressures the contact time generally can be reduced. Optimun contact time is dependent upon the specific catalyst used and its amount, and the temperature employed, etc.

The temperature range is 400°–700° but the exact temperature can vary with the catalyst and the nitrile. Generally, catalysts which are predominately oxides are used at 600°–650° C. while the metal catalysts are used at 500°–550° C. The specific optimun temperature can also depend on contact time, pressure, and ratio of hydrogen to nitrile.

The reaction is one in which hydrogen is needed to form HCN from the CN moiety. Usually a molar equivalent of hydrogen yields the desired product. Molar ratios of hydrogen to nitrile are generally 1/1 to 5/1, but the ratio can be lower, e.g., 0.1–0.5/1, or can be higher, as 10/1.

The metals, Ru, Rh, Pd, Pt, and Ir are particularly useful catalysts when in a finely divided state with a large surface area. They are obtained by means known to the art such as by mixing a solution of the metal salt with a support, such as silica, alumina, charcoal, etc., and then reducing the metal solution to give the supported metal. This conventional process provides supported metal catalysts having a preselected metal content, preferably 0.1-5% although lower or higher concentrations can be achieved.

The oxide catalysts can be made by any conventional or suitable method known in the art. For example, these methods include direct heating of the elements, e.g., Al, Mg, Cr, Zn, and Mn in air to form the oxides, or by decomposition of their nitrates or hydroxides. Other methods include evaporation, impregnation or precipitation, each followed by calcination.

In the precipitation method, aqueous solutions of the desired constituents are mixed with a solution of a precipitating agent. A variety of bases or base forming compounds can be used for this purpose as for example aqueous ammonia, ammonium carbonate, ammonium bicarbonate, urea and the like. The presence of impurities in the final catalyst is minimized by carrying out the precipitation with dilute solutions and by using ammonia or ammonia salts as the precipitant along with nitrates of the desired metals. The resulting precipitate then requires a minimum of washing since any adsorbed material remaining can be removed in the subsequent calcination step. The use of nitrates is recommended since other anions such as sulfate or halide generally act as catalyst poisons. Where a metal halide or sulfate is used, it is important to wash the precipitated material thoroughly to remove such deleterious ions.

In the impregnation method, a solution of an active component or components such as a chromium salt is contacted with a support such as $SiO_2$ to thoroughly wet it. An excess of the impregnating solution is generally used and when the support is thoroughly saturated, the excess solution is removed, as by filtration or decantation. The impregnated support is then dried and subjected to calcination. The use of nitrate solutions is also recommended in this method.

In the evaporation method, the desired components e.g., such as silica (for example an aqueous colloidal silica sol sold under the name Ludox ®) and aluminum or magnesium salt and/or a metal salt such as palladium nitrate are mixed together with water. The water is evaporated and the resultant solid is dried and calcined. This method is of value where unwanted materials are not present and a washing step is not needed.

In the calcination step which decomposes nitrates, carbonates, hydroxide, etc, to the oxides, the catalyst material is heated in air to a temperature which is generally below 800° C. The calcination is usually carried out for a period of hours, as, for example, overnight. When metal halides are used, they can be activated by heating in a stream of hydrogen.

While not always applicable, a guiding principle which is generally advantageous is to prepare the catalyst with as large a surface area as possible.

In the catalyst preparation, relatively small amounts of other metals from the main groups of the Periodic Table or one or more of the rare earths can be added as textural promoters, i.e. to prevent undue loss of surface area of the catalyst.

The catalysts can be reactivated by burning off any carbonaceous deposit which may form after use. The burning off can be done, for example, by flushing the reactor and its contained catalyst with heated air or oxygen for a suitable time as is known in the art. Extremely high temperatures are to be avoided since they may fuse the catalyst.

The reaction of the invention should be carried out in the absence of an oxidative atmosphere (air or oxygen) since oxygen reacts with hydrogen. A nonoxidative atmosphere can be readily obtained by raising the temperature of the reactor and its contained catalyst to the desired temperature and then flushing out the air with stream or nitrogen, etc., before introducing the reactants. Added inert diluents, such as nitrogen, methane, argon, etc. Water can also be present but is not preferred since its presence may give lower yield of HCN and increase the difficulty of separation of the products.

The reactants are preferably introduced as gases to the catalyst since they are normally used above their boiling point.

After passage of the gases through the catalyst bed or series of beds, the process streams can be cooled to condense any unused organic starting materials such as benzonitrile and the products formed, e.g., benzene and hydrogen cyanide. The products may be separated by known methods such as extraction with appropriate solvents or absorption techniques. Unreacted nitriles can be recycled and hydrocarbons can be separated.

The presence of hydrogen cyanide can be determined by analysis. A qualitative assay for HCN is as follows:

The gaseous effluent from the reactor is passed through 10% $H_2SO_4$ to remove $NH_3$ and then into a 1N NaOH solution. To this solution is added 1 drop of about 4% ferrous ammonium sulfate solution and 1 drop of about 5% ferric chloride solution. The suspension is heated to boiling and acidified with 10% $H_2SO_4$. A blue color (Prussian Blue) indicates the presence of cyanide. Neither ammonia nor methylamine interferes with this test. HCN concentrations of $10^{-5}$ M give a detectable response.

Quantitative analysis can be conducted by use of a commercial cyanide specific electrode and a pH meter. A preferred procedure involves gas chromatography (GC). The procedure for single phase analysis of the entire effluent from the reactor involves passing the effluent through heated transfer lines into a sample valve with a 0.5 cc loop kept at 250° C. The gaseous sample is injected onto a 4' × ¼" column of Porapak Q ® (cross-linked porous polymer beads sold by Waters Associates). The initial temperature of 120° C. is maintained for 2 min and then programmed to 240° C. at 32°/min with a He carrier flow of 25 ml/min. Response factors to convert peak areas to mole percent were determined for this method.

SPECIFIC EMBODIMENTS OF THE INVENTION

In the following representative examples all parts are by weight, temperatures are degrees Centigrade, and pressures are one atmosphere unless otherwise stated. In all the examples a general procedure was followed wherein the various catalysts, generally weighing about 2 to 6.5 grams, were charged into the middle section of a 12 × 150 mm Vycor ® tube heated at selected temperatures, the contained air being flushed out, and hydrogen and organic nitrile being introduced at selected molar ratios. Quantitative analysis was by gas chromatography or by electrochemistry.

EXAMPLE 1

Through a tubular reactor (as described above) charged with 4.3 g of 33% $Cr_2O_3$ on silicated alumina ("Harshaw Cr 0304") heated at 400°, 500°, and 600° C. for 10 minutes at each temperature, was passed benzonitrile at a rate of 5 ml/hr and hydrogen at a rate of 19 ml/min. Color test and IR showed the presence of HCN in the reaction mixture.

EXAMPLE 2

Using a catalyst of 2 g of 19% chromia on alumina ("Harshaw Cr 0205") at 600° C. and a feed rate of 66 mmole of benzonitrile, 134 mmole of hydrogen per hour for a ten minute period gave 2.31 mmole of HCN.

To illustrate the prior art, the reaction carried out under the same conditions above but in the absence of a catalyst produced only 0.15 mmole of HCN. This shows that the present invention produces more than 15 times as much HCN.

EXAMPLE 3

The following table shows varying rates of hydrogen with benzonitrile passed through 6.4 g 1.1% Pd on silica at 550° using a constant rate of hydrogen feed of 0.1 mole/hr.

TABLE I

| (a) Molar ratio of $H_2/C_6H_5CN$ | (b) %HCN in exit gas | (c) Selectivity to HCN[1] | (d) Conversion of $C_6H_5CN$[2] Mole % | (e) % Conversion to HCN[3] | (f) Space/Time/yield[4] |
|---|---|---|---|---|---|
| 1 | 16 | 1.00 | 32 | 32 | 136 |
| 2 | 12 | 0.92 | 40 | 36 | 76 |
| 4 | 11 | 0.86 | 62 | 54 | 57 |
| 8 | 7 | 0.74 | 89 | 65 | 35 |
| 16 | 3 | 0.56 | 100 | 56 | 15 |

[1]Selectivity is calculated as ratio of moles of HCN to that of nitrogeneous products (HCN, $NH_3$, $CH_3CN$ and $2N_2$) produced.
[2]% HCN in exit/theoretical maximum % HCN in exit multiplied by the selectivity to HCN.
[3]Product of columns (c) and (d).
[4]mg of HCN/g of catalyst/hour.

EXAMPLE 4

Two grams of a 1.1% $Pd/SiO_2$ catalyst was used at varying temperatures as indicated below. Table II shows results obtained at an input rate (A) of 2.5 ml of benzonitrile per hour with 9 ml of hydrogen per minute and (B) of 10 ml/hr of benzonitrile and 36 ml/min of hydrogen. The selectivity to HCN is ratio of moles of HCN to total nitrogenous products. Conversion to HCN is product of columns 2 and 3.

TABLE II

| Temperature ° C | Conversion of $C_6H_5CN$ Mole % | | Selectivity to HCN | | % Conversion to HCN | |
|---|---|---|---|---|---|---|
| | (A) | (B) | (A) | (B) | (A) | (B) |
| 350 | — | — | — | — | <0.5 | <0.5 |
| 400 | 15 | 12 | 0.82 | 0.84 | 12 | 10 |
| 450 | 36 | 21 | 0.78 | 1.00 | 28 | 21 |
| 500 | 48 | 31 | 0.67 | 0.94 | 32 | 29 |
| 550 | 59 | 53 | 0.64 | 0.85 | 37 | 45 |
| 600 | 46 | 45 | 0.78 | 0.90 | 36 | 41 |
| 650 | 51 | 40 | 0.65 | 0.92 | 33 | 37 |

EXAMPLES 5-12

The following examples were conducted with benzonitrile as the nitrile and with the catalysts shown. The production of HCN is expressed as mg HCN/g catalyst/hr (STY) and the conversions were determined by electrochemistry using a cyanide specific electrode.

TABLE III

| Example No | Catalyst | Temperature ° C | Feed Ratio $H_2/C_6H_5CN$ (Molar) | Feed Rate of Benzonitrile g/g Catalyst/hr | Conversion to HCN mole % | STY |
|---|---|---|---|---|---|---|
| 5 | 0.5% $Pd/Al_2O_3$ | 500 | 1.1 | 2.5 | 12 | 76 |
| 6 | 0.5% $Pd/Al_2O_3$ | 600 | 1.1 | 2.5 | 17 | 112 |
| 7 | 0.3% $Pt/SiO_2$ | 600 | 1.3 | 2 | 7 | 35 |
| 8 | MgO | 600 | 1.3 | 2 | 3 | 9 |
| 9 | REO/Y Zeolite[1] | 600 | 1.3 | 2 | 15 | 78 |
| 10 | 0.5% Pd/REO/Y Zeolite[1] | 600 | 1.3 | 2 | 4 | 9 |
| 11 | ZnO | 600 | 1.9 | 1.5 | 21 | 79 |
| 12 | 19% $Cr_2O_3/Al_2O_3$ | 600 | 2.0 | 3.4 | 21 | 375 |

[1]Rare Earth Oxides exchanged silica alumina zeolite "Linde SK500"

EXAMPLES 13-87

The following examples were also run according to the general procedure. The feed rates of the reactants at the stated temperatures were as follows:

| Temperature ° C | Hydrogen ml/min | Liquid Benzonitrile ml/hour |
|---|---|---|
| 550 | 9 | 2.5 |
| 600 | 18 | 5 |
| 650 | 36 | 5 |

Analysis of the products was by gas chromatography.

TABLE IV

| Example No | Catalyst | Temperature ° C | Conversion of $C_6H_5CN$[1] | Selectivity to HCN[2] |
|---|---|---|---|---|
| Control | None | 550 | 0.3 | 1.00 |
| Control | None | 600 | 1 | 1.00 |
| Control | None | 650 | 7 | 1.00 |
| 13 | 1% $Pd/SiO_2$ | 550 | 56 | 0.64 |
| 14 | 1% $Pd/SiO_2$ | 600 | 58 | 0.78 |

TABLE IV-continued

| Example No | Catalyst | Temperature °C | Conversion of $C_6H_5CN^{(1)}$ | Selectivity to $HCN^{(2)}$ |
|---|---|---|---|---|
| 15 | 1% Pd/SiO$_2$ | 650 | 100 | 0.66 |
| 16 | 1% Pd/ZnO | 600 | 5.4 | 0.75 |
| 17 | 1% Pd/ZnO | 650 | 9 | 0.72 |
| 18 | 1% Pd/MgO | 600 | 23 | 0.85 |
| 19 | 1% Pd/MgO | 650 | 26 | 0.89 |
| 20 | 19% MnO/Al$_2$O$_3$ | 600 | 37 | 0.59 |
| 21 | 19% MnO/Al$_2$O$_3$ | 650 | 65 | 0.62 |
| 22 | 10% Cr$_2$O$_3$/SiO$_2$ | 550 | 13 | 0.67 |
| 23 | 10% Cr$_2$O$_3$/SiO$_2$ | 600 | 9 | 0.79 |
| 24 | 10% Cr$_2$O$_3$/SiO$_2$ | 650 | 24 | 0.93 |
| 25 | 0.5% Pd/Al$_2$O$_3$ | 600 | 48 | 0.48 |
| 26 | 0.5% Pd/Al$_2$O$_3$ | 650 | 100 | 0.22 |
| 27 | 0.1% Pd/SiO$_2$ | 550 | 0.8 | 0.36 |
| 28 | 0.1% Pd/SiO$_2$ | 650 | 34 | 0.49 |
| 29 | 12% Cr$_2$O$_3$/MgO/Al$_2$O$_3$ | 550 | 34 | 0.36 |
| 30$^{(3)}$ | 12% Cr$_2$O$_3$/MgO/Al$_2$O$_3$ | 650 | 100 | 0.07 |
| 31 | 0.5% Pt/Al$_2$O$_3$ | 550 | 85 | 0.11 |
| 32 | 0.5% Pt/Al$_2$O$_3$ | 650 | 100 | 0.48 |
| 33 | 0.5% Rh/Al$_2$O$_3$ | 550 | 54 | 0.27 |
| 34 | 0.5% Rh/Al$_2$O$_3$ | 650 | 78 | 0.57 |
| 35 | 0.5% Ru/Al$_2$O$_3$ | 550 | 40 | 0.4 |
| 36 | 0.5% Ru/Al$_2$O$_3$ | 650 | 100 | 0.40 |
| 37 | 10% Cr$_2$O$_3$/Al$_2$O$_3$ | 550 | 39 | 0.17 |
| 38 | 10% Cr$_2$O$_3$/Al$_2$O$_3$ | 650 | 92 | 0.52 |
| 39 | 1% Pd/MgO | 550 | 33 | 0.79 |
| 40 | 1% Pd/MgO | 650 | 39 | 0.84 |
| 41 | 20% Cr$_2$O$_3$/MgO | 550 | 10 | 0.54 |
| 42 | 20% Cr$_2$O$_3$/Mgo | 650 | 18 | 0.88 |
| 43 | 94% Al$_2$O$_3$/6% SiO$_2$ | 550 | 31 | 0.05 |
| 44 | 94% Al$_2$O$_3$/6% SiO$_2$ | 650 | 82 | 0.66 |
| 45 | 0.3% Pt/SiO$_2$ | 550 | 21 | 0.87 |
| 46 | 0.3% Pt/SiO$_2$ | 650 | 39 | 0.86 |
| 47 | MgO | 550 | 9 | 0.16 |
| 48 | MgO | 650 | 23 | 0.84 |
| 49 | Cr$_2$O$_3$ | 550 | 10 | 0.38 |
| 50 | Cr$_2$O$_3$ | 650 | 12 | 0.77 |
| 51 | Al$_2$O$_3$ | 550 | 23 | 0.15 |
| 52 | Al$_2$O$_3$ | 650 | 71 | 0.69 |
| 53 | 20% Cr$_2$O$_3$/SiO$_2$ | 550 | 6 | 0.59 |
| 54 | 20% Cr$_2$O$_3$/SiO$_2$ | 650 | 30 | 0.94 |
| 55 | 0.5% Rh/SiO$_2$ | 550 | 38 | 0.15 |
| 56 | 0.5% Rh/SiO$_2$ | 650 | 32 | 0.39 |
| 57 | 0.4% Ru/SiO$_2$ | 550 | 11 | 0.91 |
| 58 | 0.4% Ru/SiO$_2$ | 650 | 18 | 0.99 |
| 59 | 10% MnO/SiO$_2$ | 550 | 7 | 0.51 |
| 60 | 10% MnO/SiO$_2$ | 650 | 20 | 0.94 |
| 61 | 1% Pd/SiO$_2$/Al$_2$O$_3$ | 550 | 35 | 0.12 |
| 62 | 1% Pd/SiO$_2$/Al$_2$O$_3$ | 650 | 90 | 0.66 |
| 63 | 10% MgO/SiO$_2$ | 550 | 2.5 | 0.41 |
| 64 | 10% MgO/SiO$_2$ | 650 | 4.7 | 1.00 |
| 65 | 1% Ru/MgO | 550 | 19 | 0.81 |
| 66 | 1% Ru/MgO | 650 | 16 | 0.90 |
| 67 | 1% Pt/SiO$_2$ | 550 | 7.7 | 1.00 |
| 68 | 1% Pt/SiO$_2$ | 650 | 15 | 1.00 |
| 69 | 5% Ir/SiO$_2$ | 550 | 47 | 0.13 |
| 70 | 5% Ir/SiO$_2$ | 650 | 54 | 0.39 |
| 71 | 1% Pd/C | 550 | 16 | 0.69 |
| 72 | 1% Pd/C | 650 | 35 | 0.82 |
| 73 | 1% Pt/C | 550 | 37 | 0.86 |
| 74 | 1% Pt/C | 650 | 52 | 0.86 |
| 75 | 1% Ir/MgO | 550 | 20 | 0.70 |
| 76 | 1% Ir/MgO | 650 | 24 | 0.94 |
| 77 | MnO | 550 | 38 | 0.04 |
| 78 | MnO | 650 | 27 | 0.18 |
| 79 | π-Al$_2$O$_3$ | 650 | 66 | 0.59 |
| 80 | 5% Cr$_2$O$_3$/SiO$_2$ | 650 | 31 | 1.00 |
| 81 | 1% Pt/MgO | 550 | 6 | 0.81 |
| 82 | 1% Pt/MgO | 650 | 17 | 1.00 |
| 83 | 1% Cr$_2$O$_3$/SiO$_2$ | 550 | 13 | 0.58 |
| 84 | 1% Cr$_2$O$_3$/SiO$_2$ | 650 | 20 | 0.84 |
| 85 | 5% Pd/SiO$_2$ | 550 | 59 | 0.68 |
| 86 | (4) | 550 | 53 | 0.20 |
| 87 | (4) | 650 | 56 | 0.62 |

$^{(1)}$The conversion of $C_6H_5CN$ is based on the yield of products with the assumption that all the nitrogen converted is accounted for by $2N_2+NH_3+HCN+CH_3CN$.
$^{(2)}$The selectivity to HCN is calculated as ratio of moles of HCN to those of total nitrogenous products.
$^{(3)}$In Example 30 the low ratio of HCN obtained resulted from destruction of HCN by subsequent reaction through too long a contact time.
$^{(4)}$This catalyst was prepared by mixing together 17.4 g aluminum nitrate, 12.8 g magnesium nitrate, 10.5 g chromium nitrate, 7.3 g zinc nitrate, 5 g manganese nitrate, 2 g Ludox HS ®, 49 mg RuCl$_3$, 43 mg PdNO$_3$, 25 mg RhCl$_3$, 44 mg H$_2$PtCl$_6$ and 29 mg IrCl$_3$ and then heating the mixture to 250° C for two hours and then at 500° C for four hours followed by crushing and grinding to a 10-20 mesh particle size.

EXAMPLES 88-101

The following examples, using the general procedure, show the use of different nitriles with 19% Cr$_2$O$_3$/Al$_2$O$_3$ catalyst (in amount from 2-5 g) at 600° C.

TABLE V

| Example No. | Organonitrile | Nitrile flow ml(liq)/hr | H$_2$ flow ml/min | Ratio of HCN formed to HCN with no catalyst |
|---|---|---|---|---|
| 88 | 2-CH$_3$C$_6$H$_4$CN | 5 | 40 | 4.3 |
| 89 | C$_6$H$_5$CH$_2$CN | 2 | 40 | 110 |
| 90 | CH$_3$CN | 2 | 36 | 21 |
| 91 | CH$_2$=C(CH$_3$)CN | 2 | 18 | 2.8 |
| 92 | CH$_2$=CHCN | 2 | 18 | 16 |
| 93 | (CH$_3$)$_3$CCH$_2$CN | 2 | 15 | 3.2 |
| 94 | 2-C$_2$H$_5$C$_6$H$_4$CN | 2 | 15 | >6.5 |
| 95 | 2,5-(CH$_3$)$_2$C$_6$H$_3$CN | 2 | 15 | >5.5 |
| 96 | 2,4-(CH$_3$)$_2$C$_6$H$_3$CN | 2 | 15 | >3.0 |
| 97 | NC—CH$_2$CN | — | 20 | 180 |
| 98 | 3-CH$_3$-C$_6$H$_4$CH$_2$CN | 5 | 18 | 12 |
| 99 | 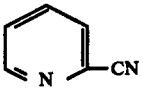 | — | 20 | 7.4 |
| 100 | 3-NC—C$_6$H$_4$CN | — | 20 | 1.6 |
| 101 (-solid) | C$_6$H$_5$CH=CHCN | 5 | 18 | >110 |

EXAMPLE 102

When the general procedure was employed with cyanogen as the nitrile and 1% Pd on SiO$_2$ as the catalyst at 450°, the ratio of HCN obtained relative to that obtained in a control experiment using no catalyst was 30.

I claim:

1. A process for preparing hydrogen cyanide comprising reacting hydrogen in the absense of air or oxygen with an organic nitrile of the formula RCN or NCR$^1$CN wherein
R is alkyl of 1-5 carbons wherein the alpha carbon bears a hydrogen atom and the beta carbon bears no hydrogen atom; alkenyl of 2-3 carbons substituted with one phenyl radical; phenyl substituted with up to three alkyl radicals of 1-2 carbons each; benzyl substituted with up to three alkyl radicals of 1-2 carbons each; or pyridyl;
R$^1$ is a single bond; methylene; phenylene substituted with up to two alkyl radicals of 1-2 carbons each;
at a temperature of 400°-700° C. in the presence of a catalyst effective to produce hydrogen cyanide selected from the group consisting of
(A) a supported metal of the group Ir, Rh, Ru, Pd and Pt and
(B) an oxide of a metal of the group Al, Cr, Mg, Mn and Zn, and recovering hydrogen cyanide.

2. The process of claim 1 wherein the organic nitrile is an aryl mononitrile.

3. The process of claim 1 in which the organic nitrile is benzonitrile.

4. The process of claim 1 in which the catalyst is selected from group (A) and the temperature is 500°-550° C.

5. The process of claim 1 in which the catalyst is selected from group (B) and the temperature is 600°-650° C.

6. The process of claim 1 in which the catalyst is palladium metal on a support.

7. The process of claim 6 in which the support is silica.

8. The process of claim 1 in which the catalyst is Cr$_2$O$_3$.

9. The process of claim 8 in which the Cr$_2$O$_3$ catalyst is supported on silica.